June 5, 1962  H. J. FLOWERS ET AL  3,037,285
NAVIGATION INSTRUMENT
Filed Oct. 30, 1958
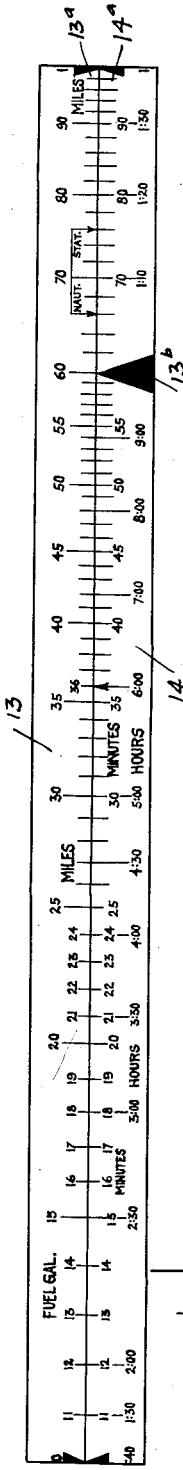
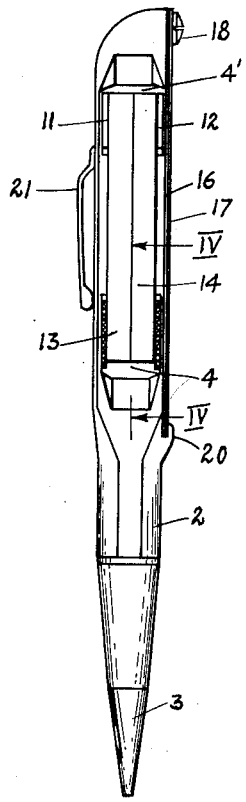
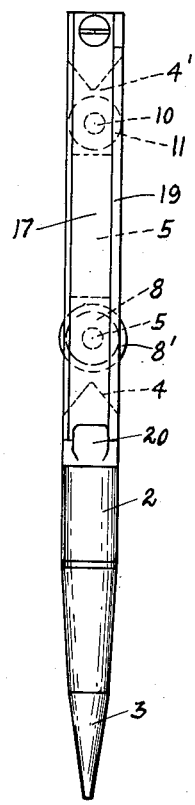
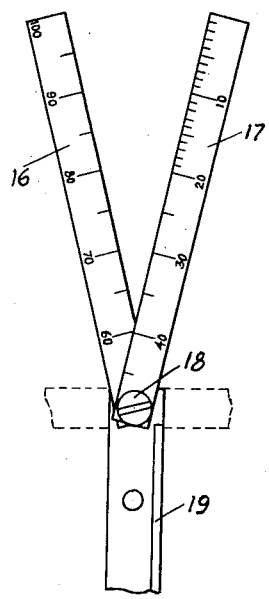
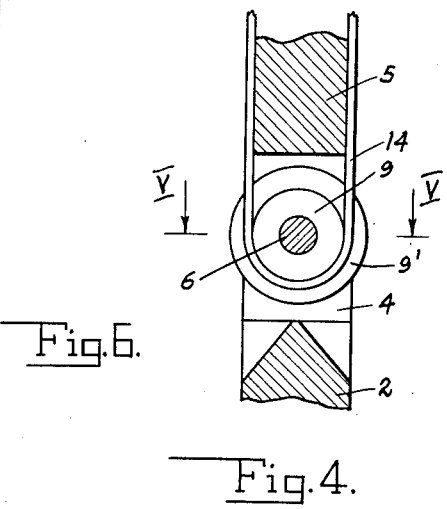
Fig.1.  Fig.2.  Fig.3.  Fig.4.  Fig.5.  Fig.6.
INVENTOR.
HAROLD J. FLOWERS.
JOHN PROTZ.
BY
ATTORNEYS.

United States Patent Office 3,037,285
Patented June 5, 1962

3,037,285
NAVIGATION INSTRUMENT
Harold J. Flowers, Latrobe, Pa. (47 Glen Road, R.D. 3, Winston Park, Farmingdale, N.J.), and John Protz, 376 S. Walnut St., Blairsville, Pa.
Filed Oct. 30, 1958, Ser. No. 770,707
1 Claim. (Cl. 33—1)

This invention is for a navigation aid for air pilots, and more specifically it is for a navigation aid primarily useful for contact flying of aircraft, and is also useful in instrument navigation.

One piloting an airplane, particularly a private plane without a navigator, often has his attention quite fully occupied with handling the ship. Nevertheless, there are many problems which confront a pilot requiring rapid solution. Various implements have heretofore been devised for this purpose, but they require the use of both hands to manipulate them and have other drawbacks.

The present invention has for its object to provide a convenient combination instrument that may be held and operated in one hand, and which will solve most of the mathematical problems of contact flying confronting a pilot, as well as being useful for instrument navigation. It may also be used as a rule, a divider, or in conjunction with a compass as a protractor. Additionally it provides a convenient pen or pencil so that any necessary data may be recorded.

A further object of our invention is to provide a convenient, simple, inexpensive combination tool which can be carried like a pen in one's pocket, and has little more weight or bulk than many automatic pens or pencils now necessarily carried in addition to the other devices.

These and other objects and advantages are secured by our invention as will more fully appear from the following detailed description in conjunction with the accompanying drawings.

In the drawings:

FIG. 1 is a front elevation of the device;

FIG. 2 is a side view thereof;

FIG. 3 is a side view of the upper end only of the device, with its arms extended;

FIG. 4 is a fragmentary longitudinal section on an enlarged scale in the plane of line IV—IV of FIG. 1;

FIG. 5 is a fragmentary transverse section in the plane of line V—V of FIG. 4; and FIG. 6 is a projected view on a larger scale of the two calculator bands opened out flat.

Referring to the drawings in detail, the device comprises a rigid body 2, preferably of light metal and of generally rectangular cross section. At one end there is secured a ball point pen or pencil assembly, designated generally as 3, and the detail construction of which is well known and forms no part per se of the present invention.

The body has two openings formed therein in its wider faces, these openings, designated 4 and 4', being separated from each other, leaving a solid body of metal 5 between them. Passing through the body so as to traverse the lower opening 4 is a pin 6 (see FIG. 5). On this pin are two independently rotatable drums 8 and 9, each having a knurled projecting flange at one end, these being 8' and 9'. There is a similar pin 10 through the other opening on which are independently rotatable rollers 11 and 12.

An endless plastic band 13 passes around drums 8 and 11 and a parallel band 14 passes around drums 9 and 12. By holding the device in one hand, one may use the thumb of the same hand to engage either of the knurled flanges 8' or 9' to effect relative movement between the belts or bands 13 and 14.

In FIG. 6 we have shown the characteristic indicia on these bands. The bands are opened out as if cut on the index mark at 10 at the beginning of the scale on each.

Band 13, beginning with index mark numbered as 10 on scale, has a scale 13a that is logarithmically calibrated from 10 to 100, the calibrations being progressively more crowded toward the right hand end of the scale as viewed in this figure. It contains also the indicia reading "Fuel Gal" and "Miles."

The other band 14 has a scale 14a that exactly matches 13a and the scale markings on the confronting edges aline when the index marks beginning with 10 are opposite each other. This scale has a second row of figures indicative of hours of time and the primary scale at the 60 mark is a conspicuous index point 13b.

The device is a moving band slide rule, and like all slide rules, it does not carry out to decimal places or ciphers. For example, 20 on the scale may mean 2, 20, 200 or .2 or .02 or any other figure starting with two, and the person using the instrument will have no difficulty in interpolating the proper figure in conjunction with the problem being solved. Its functions are multiplication and division.

To multiply, band 13 is moved to bring the index mark 10 opposite the number on band 14 to be multiplied. The result will then be on band 14 opposite the multiplier on band 13. For example to multiply 120 × 15 the index mark on band 13 will be moved opposite the number 12 (120) calibration on band 14. Opposite numeral 15 on band 13 will be the solution 18 (1800) on band 14.

To divide, place the divisor on band 14 opposite the number to be divided on band 13. The solution will be read on band 13 opposite the index mark of band 14.

For example, to divide 240 by 16, bring number 16 on band 14 opposite 24 (240) on band 13. The answer, 15, will appear on band 13 opposite the index figure.

Time-distance calculations may thus be made. Since each hour comprises 60 minutes, the number 60 is used in place of the unit index, and the solution in minutes will be obtained. For example, assume a speed of 150 m.p.h., what distance would be covered in 20 minutes? Place the 60 mark, 14b, on band 14 opposite 15 (150) on band 13. Opposite the number of the scale on band 14 will appear the answer on band 13, i.e., 50 miles.

Conversely, knowing the time and distance, the space in miles per hour would be obtained by dividing the distance by the time. For example, the distance is 40 miles and the time 15 minutes. The ground speed is determined by placing number 15 of the scale on band 14 opposite the mark 40 on band 13. The answer would be on band 13 opposite the 60 index mark 16 (160) miles per hour.

Again if the distance is 1900 miles and the time is 12 hours, then bring 12 on band 14 opposite 19 (1900) on band 13. The answer, 158 (15.8) will appear on band 13 opposite the index mark 10.

To calculate miles per hour with a time measurement in seconds, read m.p.h. opposite the 36 index, since there are 3600 seconds in an hour. It will be noted that 36 on band 14 coincides with the 6 hour mark of the second scale on this band and this division into hours and minutes may also be considered as minutes and seconds. Therefore, to find the miles per hour, divide miles by minutes and seconds on the time scale on band 14 and read miles per hour opposite the numeral 6 on the outer time scale, which is 36 on the regular scale on band 14. For example, the plane travels 4 miles in 1 minute, 50 seconds. Place 1:50 on the time scale of band 14 opposite 4 (40) on band 13. On band 13 opposite the time figure 6 of band 14 will be the answer, 13 (130 m.p.h.).

Fuel consumption problems are the same as speed problems. The 60 index on band 14 is moved opposite the gallons used per hour, and opposite the time in minutes on band 14 will be the gallons used during the selected period. For example, suppose the fuel consumption rate is 18 gal. per hour, and the time is 3 hours, 15 minutes=195 minutes. The index 60 on band 14 is moved opposite numeral 18 on band 13. Read the fuel used on band 13 opposite numeral 19.5 (195) on band 14, or 58½ gal.

Likewise descent or climb may be calculated by dividing the altitude to be lost (or gained) by the rate of descent, reading minutes required opposite the index 10, there being no conversion from hours to minutes in this case. Problem: Flying at 4,000 feet, at what time shall descent be started to arrive at an altitude of 800 feet at a rate of 400 feet per minute? This is solved by placing the numeral 40 (400) on band 14 opposite 32 (3200=4000—800) on band 13. The answer is on band 13 opposite the index mark on band 14, or 80=8 minutes.

It will be seen that these calculations can be made using one hand, and incidentally to other duties occupying the pilot's attention.

At the end of the instrument opposite the pencil end are two thin metal arms 16 and 17 held in place by a pivot pin 18. There is a ledge 19 down one face of the body against which these arms lie when they are folded down alongside the body. A little overhanging clip 20 under which the free ends of the arms are engaged when they are folded. These arms can be opened out at different angles and used as a divider. They are calibrated along their length for scaling maps and when opened out into alinement with each other may span a substantial distance. Used in connection with a compass, the arms may also be used as a protractor.

Since the tool combines all of the functions above explained and provides a convenient pencil or pen, it replaces much more cumbersome and numerous instruments that the pilot now has to carry. The body of the instrument, being slender, like a pen or pencil, is easily held in the hand and takes little room in one's pocket. It will be seen that the openings 4 and 5 through the body provide adequate clearance for the bands 13 and 14 to be viewed where they pass around the rolls, so that if it is necessary to read indicia in this area, it can be seen. The fourth side of the body of the instrument has a conventional pocket clip 21 thereon.

While we have shown a preferred form of our invention it will be understood that the detail construction and shape of parts may be varied.

We claim:

A calculating instrument for navigational purposes designed to be operated with one hand whereby a pilot may make calculations while having his other hand free to operate the aircraft which he is navigating, said instrument comprising a rigid body of generally square section with a tapered portion at one end, said tapered portion constituting a handle section which may be grasped by one's clenched hand, the body having an opening therethrough adjacent the tapered portion from one side to the other, the body having a second opening therethrough near the end of the body remote from the tapered portion, a shaft passing transversely through the body at right angles to the openings and positioned to traverse the first said opening, said shaft having a pair of separately rotatable drums thereon contained within the opening, each drum having at the end thereof remote from the other drum a flange that projects beyond the plane of the surfaces of the body in which the opening is formed, said flanges of the drums being in position to be engaged by the thumb of the hand in which said tapered end is grasped, the body having a second shaft passing transversely through the second opening, a second pair of separate drums on the second shaft in the second opening, each drum of the second pair being in alignment with a drum of the first pair, an endless belt passing over each of two such aligned drums with the reaches of the bands between the drums being supported against the flat sides of the body between the two openings and being visible at both sides of the body, said bands having matched logarithmically-calibrated scales thereon along their confronting edges, said openings through the body having oppositely-inclined end walls at that end of each opening which is not covered by the bands, the inclined walls converging to a pointed edge at substantially the plane of the axes of the pins passing through said rollers whereby indicia on the bands is for practical purposes unobscured where the bands extend around the rollers and indicia thereon can be seen from one side or the other of the body.

References Cited in the file of this patent

UNITED STATES PATENTS

| 1,940,134 | Levin | Dec. 19, 1933 |
| 2,764,348 | Johnson | Sept. 25, 1956 |
| 2,806,649 | Nicolet et al. | Sept. 17, 1957 |

FOREIGN PATENTS

| 12,510 | Great Britain | 1912 |